United States Patent
Wayne

[11] 3,893,498
[45] July 8, 1975

[54] PNEUMATIC TIRE
[75] Inventor: Lee Wayne, Barberton, Ohio
[73] Assignee: The Firestone Tire & Rubber Company, Akron, Ohio
[22] Filed: June 13, 1974
[21] Appl. No.: 478,992

[52] U.S. Cl..... 152/209 R; 152/DIG. 1; 152/DIG. 3
[51] Int. Cl.² .................. B60C 11/06; B60C 11/12
[58] Field of Search....... 152/209 R, 330 R, DIG. 1, 152/DIG. 3

[56] References Cited
UNITED STATES PATENTS
| | | | |
|---|---|---|---|
| 2,225,595 | 12/1940 | Schrank | 152/209 R |
| 2,261,025 | 10/1941 | Havens | 152/209 R |
| 3,550,665 | 9/1968 | Verdier | 152/209 R |

FOREIGN PATENTS OR APPLICATIONS
| | | | |
|---|---|---|---|
| 2,086,748 | 12/1971 | France | 152/209 R |
| 2,123,174 | 9/1972 | France | 152/209 R |

*Primary Examiner*—Drayton E. Hoffman

[57] ABSTRACT

This disclosure relates to a tire tread design which can be utilized in pneumatic tires but is specifically applicable to belted pneumatic tires. The design comprises a V-shaped groove which contains numerous lateral channels in the walls of the groove. This configuration enables one to obtain the better resistance to stone capturing and holding of the V-shaped groove yet retain good wet pavement traction in the tire as the tread is progressively worn off. The design is particularly useful in tire having belted type constructions.

12 Claims, 4 Drawing Figures

PNEUMATIC TIRE

This is a continuation of application Ser. No. 339,241, filed Mar. 8, 1973, now abandoned.

BACKGROUND OF THE INVENTION

This invention relates to pneumatic tires and the tread design utilized on such tires. For many years, a conventional tread design in pneumatic tires has been some form of a series of circumferential grooves which define companion circumferential ribs. When tires having tread designs of this type are run over gravel or loose, stony surfaces, they can pick up or capture stones in the grooves of the tread design. If these stones are retained in the grooves, there have been instances where such stones eventually bore through the remainder of the tire tread and tire carcass thereby causing the tire to fail.

Many different configurations of tread grooves have been disclosed in an effort to lessen the stone capture and stone holding characteristics of the tire's tread design. One such configuration that has been suggested is to provide the groove with a V-shaped cross section (see U.S. Pat. No. 3,457,981, column 2, lines 31-37). It has been established that V-shaped grooves of this type are better than grooves whose walls are substantially parallel when considering the resistance of the groove to picking up stones and holding stones after they have been picked up.

Even with this known advantage, the V-shaped groove has not been commercially exploited to any substantial degree. This is due to the fact that the worn appearance of a tire having a V-shaped groove has been considered unacceptable and, more importantly, it has been considered that the worn tire has less traction and less resistance to skidding under wet road conditions as a result of having V-shaped grooves. These two factors have been considered inherent with the V-shaped groove design. With a V-shaped groove it is obvious that as the tread is worn off the width of the groove will decrease which results in larger rib areas giving larger areas of unbroken tread surface. These large unbroken tread surface areas are considered objectionable from an appearance standpoint as the tire looks less aggressive.

This decrease in groove width also causes the traction or skid resistance deficiency in wet road conditions in the worn tire. The tread design is less cut-up and less aggressive. It approaches a plain tread surface (no grooves). It is well known that plain tread surface tires are very poor for resistance to skid and traction under wet road conditions.

The wet road traction or skid resistance of any tire generally decreases as the tire tread is worn off. This is due to the loss in efficiency and aggressiveness of the design as it is worn off. As previously stated, this is particularly true of a V-shaped groove design.

The problem of the groove capturing and holding stones is accentuated in belted type tires whether the carcass be of radial or of a bias construction. The tread grooves of belted construction tires do not open and close as they do in ordinary bias tires and this characteristic adds to stone capturing and particularly to the stone holding characteristic of the tire.

SUMMARY OF THE INVENTION

An object of this invention is to provide a tire having the good resistance to stone capturing and holding that is inherent in a V-shaped groove design yet does not suffer from the past deficiencies of the V-shaped groove; that is, the appearance of the worn tire and the decrease in wet pavement or road traction in the worn tire.

Yet another object of this invention is to provide a tire whose traction and skid resistance is actually more constant in service due to the tire maintaining a more constant coefficient of traction as the tire tread is worn off.

The tire that is the subject of this invention has a tread design which contains at least 1 groove. It is usual to have several circumferential grooves which define circumferential ribs. The groove has a V-shaped cross-sectional configuration with its sides being at an angle of at least 18° to the radial plane of the tire. The V-shaped groove is provided with a series of channels which run laterally in relation to the direction of the groove. The channels are substantially triangular in shape and have a laterally outer wall and two transverse walls.

In this channeled, V-shaped groove the channels are completely contained in the groove; that is, the laterally outer edge of the channel begins at the top of the V-shaped groove and extends radially inwardly. This configuration results in the lateral length of the channel and its transverse walls increasing as the channel extends into the side of the groove. It is contemplated that the depth of this channel be equal to the depth of the groove or, alternatively, to a depth equal to the depth of the outer most point of a wear indicator if such wear indicator is otherwise present in the tread design.

The above-identified channel configuration in the V-shaped groove results in an increase in wet pavement traction as the tire tread is progressively worn down. This increase is due to the fact that a greater length of the transverse walls of the channel are exposed in the road-contacting surface as the tire tread wears. These walls act as traction elements. This increase in wet pavement characteristics caused by the increase in effective length of the transverse walls of the channel compensates for the decrease in wet pavement traction which results from the decrease in groove width that occurs in the V-shaped groove as the tire tread is worn off.

Contra to the prior V-shaped groove constructions, the channeled, V-shaped groove construction of this invention maintains satisfactory wet pavement traction as the tire tread is progressively worn and may even increase the coefficient of traction as the tire tread is worn off. Additionally, the appearance complaints of the prior, worn V-shaped groove constructions are eliminated by the presence of the channels.

DETAILED DESCRIPTION OF THE INVENTION

Figure 1:
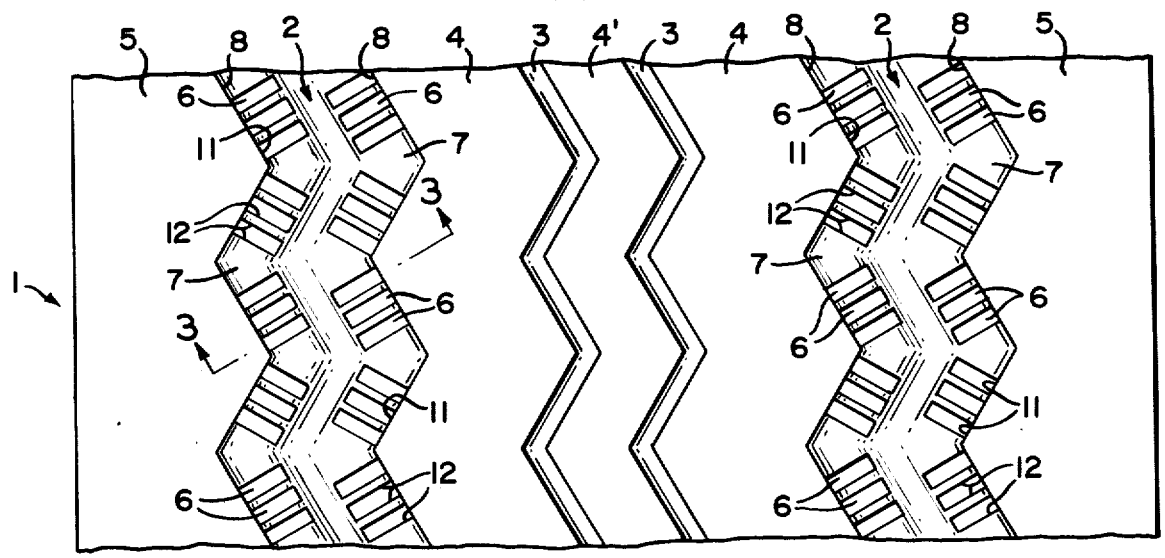
FIG. 1 is a plan view of a portion of tread surface of a tire in its new condition prior to its being worn. This view depicts the groove at full depth.
Figure 3:
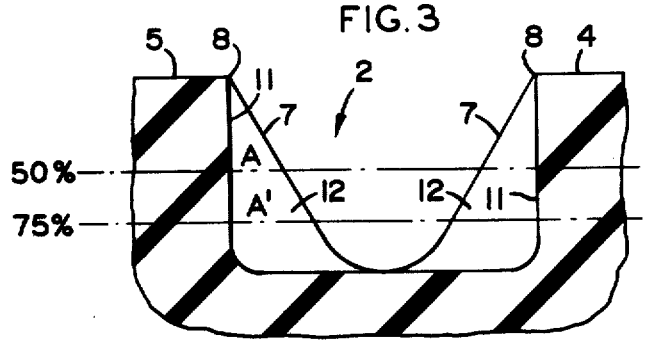

FIG. 3 is a cross-sectional view taken along line -3—3 in FIG. 1. This figure shows the cross-sectional view of the groove and a pair of its companion channels. The two horizontal broken lines represent the height of the groove at a 50% and a 75% worn condition.

Figure 4:
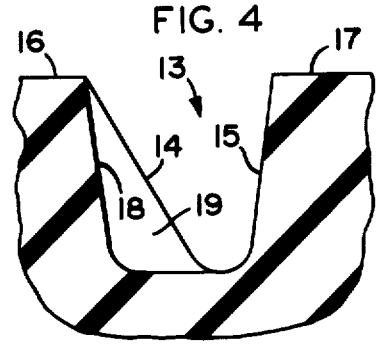

FIG. 4 is a cross-sectional view of another embodiment of the groove of this invention.

In FIG. 1 the portion of the tire tread, 1, is shown as having two V-shaped grooves, 2, and two standard parallel walled grooves, 3. These grooves define three center ribs, 4, and 4' and two shoulder ribs, 5. The V-shaped grooves contain a series of channels, 6, which are completely located within the walls, 7, of the grooves. As shown in FIG. 1, these channels do not extend into the road-contacting surface of the ribs. Specifically in FIG. 1, these channels begin at the top of the groove walls, 8, which is at the junction of the groove and rib. The triangular shaped channels each have a lateral wall, 11, and two transverse walls, 12. The lateral walls of the channels are shown extending down perpendicular to the road-contacting surface of the rib in a plane parallel to the radial plane of the tire. This cross-sectional shape of the channels is more clearly depicted in FIG. 3.

Figure 2:
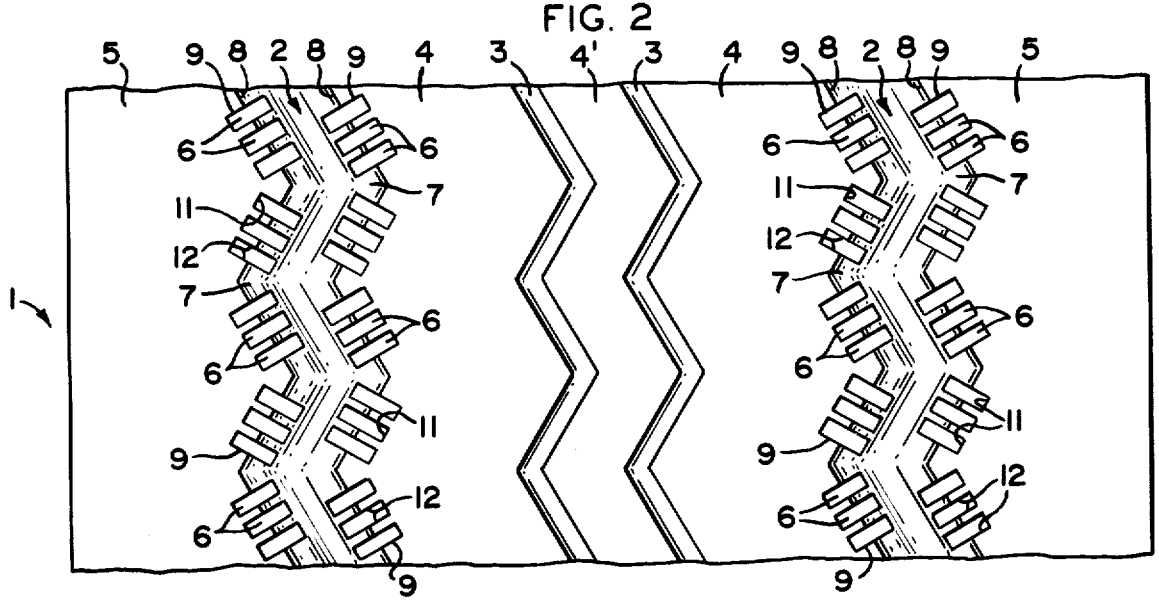
FIG. 2 is identical to FIG. 1 except the tire tread is shown with 50% of its surface worn off.

FIG. 2 is a similar view of the same tire tread as depicted in FIG. 1 but in FIG. 2 the tread is shown in a 50% worn condition. The tops of the groove wall, 8, of the V-shaped grooves have moved closer together as a result of the tread wear thereby causing a corresponding increase in the road-contacting surface of the ribs, 4 and 5. Some length, 9, of the transverse walls of the channels, 6, are now contained in the road-contacting surface whereas in FIG. 1 no portion of the transverse walls is in the road-contacting surface. Also, FIG. 2 shows the rib 4' between the two parallel walled grooves has not changed its lateral width during use.

FIG. 3 shows the cross-sectional shape of the channeled, V-shaped groove configuration of this invention. The lateral walls of the channels, 11, extend perpendicular to the road-contacting surfaces, 4 or 5, to a depth equal to the depth of the groove, 2. The transverse walls, 12, are substantially triangular shaped.

It is not necessary for these lateral walls of the channel to be exactly perpendicular to the road-contacting surface. They may form an angle with the plane perpendicular to the top of the groove. However, it should be recognized that as the angle of the lateral wall of the channel, 11, approaches the angle of the groove wall, 7, the effective length of the transverse walls of the channel is decreased. It is also recognized that as the angle of the lateral wall of the channel to the groove wall increases beyond a point when the lateral wall is perpendicular to the road-contacting surface that an "undercut" condition will occur in the rib. This "undercut" condition is very difficult to manufacture.

It is obvious from this cross-sectional view in FIG. 3 that as the tire tread is worn away that the transverse walls of the channel in the walls of the groove will effectively become longer and longer in the road-contacting surface of the tire tread. These walls act as traction elements and this increase gives the claimed increase in wet pavement traction. These elements are depicted at the 50% worn line as Distance A and at the 75% worn line as Distance A'. This increase in the effective road-engaging length of the transverse walls of the channel offsets the decrease in wet pavement traction that results from the effective decrease in the width of the groove.

The angle of the wall of the V-shaped groove should be at least 18° to the plane perpendicular to the road-contacting surface of the rib or, stating it another way, to the radial plane of the tire. This can be stated as being the angle between the lateral wall of the channel, 11, in FIG. 3 and the groove wall, 7. This angle is between 18° and 45°, preferably between 20° to 35°. It is understood that the resistance to stone capturing and holding decreases at this angle is decreased and that the effective wet pavement traction decreases as this angle is now increased. Angles below 18° have insufficient resistance to stone capturing and holding. Angles greater than 45° have insufficient lateral wet pavement traction characteristics.

FIG. 3 depicts the walls, 7, of the V-shaped groove symmetrically. It is understood the walls need not be symmetrical to obtain the advantages of this invention. The walls may have different angles to the road-contacting surface in relation to each other. These angles must be below 45° and one such angle must be over 18°. It is understood one angle may be below 18° as long as one wall has an angle over 18°.

FIG. 4 is an example of this asymmetric embodiment of the groove configuration of this invention. This figure depicts an embodiment of this invention in which only one wall of the groove contains the lateral channels and has an angle greater than 18 degrees to the radial plane of the tire. In FIG. 4 the cross-sectional shape of the groove, 13, is substantially V-shaped. The groove has walls 14 and 15 and adjacent road-contacting ribs 16 and 17. Wall 14 is shown having an angle greater than 18 degrees to the radial plane of the tire whereas wall 15 has an angle less than 18° to the radial plane of the tire. Wall 14 contains lateral channels, whereas wall 15 does not. The lateral channel has lateral wall, 18, and transverse walls, shown as 19. The lateral wall, 18, in the channel within wall 14 has an angle to the radial plane of the tire which is less than the angle of said groove wall 14 but not 0°. If the angle was 0°, the lateral wall would be perpendicular to the road-contacting surface, see FIG. 3, and the effective length of the transverse walls would be greater. In this embodiment it is understood that the channeled groove wall will probably have a high angle to the radial plane of the tire, on the order of 25°–35° due to small angle in the other side of the groove.

FIGS. 1 and 2 show a portion of the tread surface of the tire. The grooves and the ribs defined thereby may be circumferentially continuous around the entire tread surface or they may be interrupted and discontinuous without detracting from the invention.

Instead of being generally circumferential, the grooves may also run in a generally lateral direction on the tire without detracting from the invention.

The invention is not limited to the number of channels which are placed in the walls of the grooves. There should be a sufficient number of channels in each groove wall to provide the necessary increase in web pavement traction as the tire is worn yet not too many channels to create a problem of tread tearing.

The depth of the channels should be equal to the depth of the groove as depicted in FIG. 3 but can be less without detracting from the invention. It is understood in this type of configuration that the depth of the channel may itself be utilized as a wear indicator for the tire.

The invention is not limited to the lateral wall of the channel extending from the junction of the groove wall and the road-contacting surface of the rib. The lateral wall of the channel may extend from a point farther down on the groove wall. It is also contemplated that it may extend from a point on the road-contacting surface of the rib which is substantially at the junction of the groove wall and the rib.

The placement of the channels on opposing sides of the groove is not critical. A channel may be placed in line with a corresponding channel on the other side of the groove or it may be offset from the channels on the other side of the groove.

The spacing of the channels in relation to adjacent channels in the same side of the groove depends upon many factors; such as, the size of the tire, the specific groove — rib design utilized in the tire, and the width of the channels themselves. In truck tires it has been found that spacing between adjacent channels on the order of 0.15 to 0.25 inches is satisfactory. In passenger tires, it is believed such spacing should be on the order of 0.10 to 0.25 inches. It is recognized that these spacings will vary with different tread designs. The spacing is ultimately determined based on the worn appearance of the tire and the necessary wet pavement traction improvements that are required in the tire.

The width of the individual channels is also dependent upon the size of the tire and the specific tread design utilized in the tire. It has been found that a width of 0.05 to 0.10 inches is feasible in truck tires. It is believed 0.04 to 0.08 inches should be feasible in passenger tires.

In FIGS. 1 and 2 the channels are depicted as forming substantially 90° angles with the top of the groove. It is understood that this angle may be other than a 90° angle without departing from the scope of this invention.

It is theorized that the decrease in wet pavement traction occurring as the V-shaped groove is worn is a result of the effective decrease in the groove width that occurs. This decrease is, of course, inherent in the V-shaped groove construction. This decrease in groove width increases the width of the rib thereby giving the tire a less aggressive tread pattern. This less aggressive pattern more approaches a plain tread; that is, a tread that has no tread design in its road-contacting surface. The plain tread, although very good for wear, is very poor for wet pavement traction.

These characteristic results are clearly depicted in the comparison of FIGS. 1 and 2. FIG. 1 shows the maximum groove width of the V-shaped groove with the corresponding rib width. This occurs in a new, unworn tire. As the tire tread is worn away, the FIG. 2 condition develops in which the width of the tread grooves is decreased and the width of the tread rib is increased. FIGS. 1 and 2 also show how traction characteristics of the channels change from nothing in FIG. 1 to an effective traction element, distance 9, in FIG. 2. This is caused by the effective length of the transverse walls of the channels increasing from nothing in FIG. 1 to a length, 9, in FIG. 2 that is related to the amount of wear that the tire tread has undergone.

A specific embodiment of the tread design of this invention has given remarkable results in a stone holding test at the Applicant's test fleet in Texas. The standard test utilized by the Applicant's company consists of running a tire on a vehicle for an initial 10 miles on a gravel surface at 30 miles per hour. At the end of this 10 miles, the tire is inspected and the number and size of stones embedded in the grooves are recorded. The tire in this condition is then run 5 miles on the smooth road surface of the test track at 50 miles an hour. Again the tire is examined to determine the number of stones held in the grooves. The final phase of the test consists of another 10 miles on the smooth surface track at 50 miles per hour. The tire is again examined at the end of this final 10 miles to determine the number and size of stones trapped in the tread grooves.

In this stone holding test, the tire having the channeled V-shaped groove construction of this invention picked up and held no stones during the entire duration of the test. A standard production tire of comparable size and construction was run on the same tests under identical conditions. This tire had 13 stones, each having approximately a ½ inch diameter lodged in the grooves after 10 miles running on gravel at 30 miles per hour. After 5 additional miles on the test track at 50 miles per hour all 13 stones remained lodged in the grooves and after a further additional 10 miles on the track at 50 miles per hour, all 13 stones remained lodged in the grooves.

The specific tire tested by the Applicant was a 10.00–20 size steel cord radial truck tire. The load and inflation of the tire were standard; that is, 80 pounds inflation and 4760 pounds load per tire. The tire was mounted on a 7.5×20 rim. The ambient temperature during the test of both tires was 60° to 69°F.

The specific embodiment of the channeled, V-shaped groove utilized in this tire had two such circumferentially continuous grooves in which the angle of the walls of the V-shaped groove was 23.5° in relation to a line perpendicular to the road-engaging tread surface. The channels were spaced 0.15 inches from their adjacent channels. The depth of the channels was equal to the depth of the groove and the circumferential width of the individual channels was 0.08 inches. The tire was tested in its new, unworn condition.

Several cross-sectional configurations and embodiments of the substantially V-shaped, channeled groove of this invention have been disclosed in this application. It is understood that any number of these embodiments may be contained in a tire in any combination without departing from the scope of this invention. It is also understood that a tire may contain other grooves which do not contain the features of this invention without departing from the scope of this invention.

I claim:

1. A pneumatic tire having a tread with a tread design therein, said design having at least one groove, said groove having a substantially V-shaped cross-section with at least one of its walls at an angle of at least 18° to the radial plane of the tire, said angled wall having lateral channels, each said channel having a lateral wall extending radially inwardly from the junction of said angled groove wall and the road-contacting surface of the tread and two spaced transverse walls, said lateral walls of said channels forming an angle to said radial plane of said tire which is equal to or greater than the angle of said radial plane but less than the corresponding angle of said angled wall in which they are contained so that the tire's resistance to stone holding is improved and the effective road-contacting length of said transverse walls of said channel is increased as the tire tread is progressively worn.

2. The tire of claim 1 in which both walls of said substantially V-shaped groove form substantially identical angles to said radial plane of the tire.

3. The tire of claim 1 in which said groove walls are asymmetrical.

4. The tire of claim 1 in which both walls of said substantially V-shaped groove contain said lateral channels.

5. The tire of claim 4 in which said channels are offset in respect of the corresponding channels in the opposite groove wall.

6. The tire of claim 4 in which said channels are aligned with the corresponding channels in the opposite groove wall.

7. The tire of claim 1 in which said groove is circumferentially continuous around said tire.

8. The tire of claim 1 in which said groove extends laterally across said tread.

9. The tire of claim 1 wherein said channels have an angle of 90° to said road-contacting surface at said junction of said channels and said road-contacting surface.

10. The tire of claim 1 in which said channels are spaced at least 0.10 inches and not more than 0.25 inches from adjacent channels in the same groove wall.

11. The tire of claim 1 in which said channels have a circumferential width between 0.04 and 0.10 inches.

12. The tire of claim 1 in which said groove wall forms an angle of between 18° and 45° to said radial plane of said tire.

* * * * *

FO-1050
(5/69)

UNITED STATES PATENT OFFICE
CERTIFICATE OF CORRECTION

Patent No. 3,893,498      Dated July 8, 1975

Inventor(s) LEE WAYNE

It is certified that error appears in the above-identified patent and that said Letters Patent are hereby corrected as shown below:

Column 4, line 3, "decreases at" should read --decreases as --;

Column 4, line 53, "web" should read --wet--

Signed and Sealed this

*eighteenth* Day of *November 1975*

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,893,498     Dated September 18, 1975

Inventor(s) LEE WAYNE

It is certified that error appears in the above-identified patent and that said Letters Patent are hereby corrected as shown below:

Abstract on first page, last line, "tire" should read -tires-.

Signed and Sealed this twenty-seventh Day of January 1976

[SEAL]

Attest:

RUTH C. MASON
Attesting Officer

C. MARSHALL DANN
Commissioner of Patents and Trademarks